(No Model.)

F. MOORE.
TRIPLE VALVE FOR AUTOMATIC BRAKE MECHANISMS.

No. 445,963. Patented Feb. 3, 1891.

WITNESSES:
F. J. Hogan.
F. E. Gaithers.

INVENTOR,
Frank Moore,
by J. Trawden Bell,
Att'y.

UNITED STATES PATENT OFFICE.

FRANK MOORE, OF PITTSBURG, PENNSYLVANIA, ASSIGNOR TO THE WESTINGHOUSE AIR BRAKE COMPANY, OF SAME PLACE.

TRIPLE VALVE FOR AUTOMATIC BRAKE MECHANISMS.

SPECIFICATION forming part of Letters Patent No. 445,963, dated February 3, 1891.

Application filed August 12, 1890. Serial No. 361,791. (No model.)

*To all whom it may concern:*

Be it known that I, FRANK MOORE, a citizen of the United States, residing at Pittsburg, in the county of Allegheny and State of Pennsylvania, have invented or discovered a certain new and useful Improvement in Triple Valves for Automatic Brake Mechanisms, of which improvement the following is a specification.

My invention relates to triple valves for automatic brake mechanisms of the class known as "quick-acting," in the operation of which air is discharged from the main air or train pipe, as well as from the auxiliary reservoir, into the brake-cylinder in the application of the brakes for emergency stops.

The object of my invention is to provide improved facilities for insuring the quick release of the brakes whenever required without involving departure from the essential structural and operative features of the quick-acting triple valve as now standard, or the addition of any complicated or expensive attachments thereto.

To this end my invention, generally stated, consists in the combination of a supplemental or quick-action piston provided with a discharge-passage and a valve controlling said passage and fixed upon the stem of the quick-action supply-valve actuated by the piston.

The improvement claimed is hereinafter fully set forth.

Figure 1:
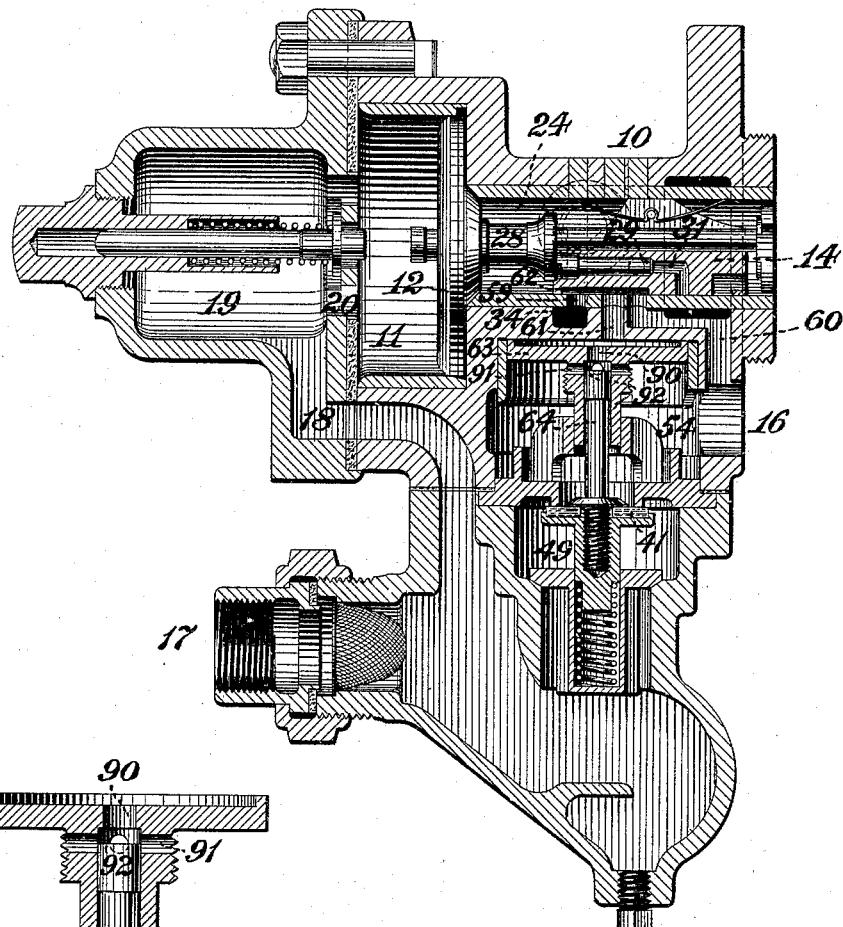
Figure 2:
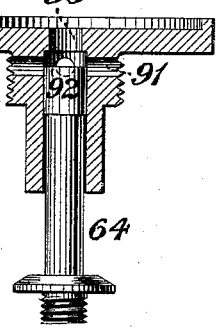

In the accompanying drawings, Figure 1 is a longitudinal central section through a triple valve with my invention applied, and Fig. 2 a similar section, on an enlarged scale, through the supplemental piston, with the supplemental valve-stem in elevation.

The quick-acting triple-valve mechanism in which my invention is herein exemplified accords in all substantial particulars with that set forth in Letters Patent of the United States No. 376,837, granted and issued to George Westinghouse, Jr., under date of January 24, 1888, and need not be herein described other or further than as to the additional features of improvement constituting my present invention. The supplemental or quick-action piston 63 is, as in Patent No. 376,837, fitted to work in a chamber 54, which communicates by a passage 17 with the main air or brake pipe, and by a passage 16 with the brake-cylinder, communication between the passages 16 and 17 being opened in making emergency stops and closed in releasing the brakes by an interposed quick-action supply-valve 41 and a check or non-return valve 49. The application and release of the brakes in making ordinary or service stops is effected through the main slide-valve 14 and graduating-valve 29, which are actuated by the main piston 12, and control supply-passages 31 and 60, leading to the brake-cylinder passage 16, and an exhaust-passage 34, which, when the slide-valve 14 is brought to release position, communicates, through the exhaust-cavity 62 of the valve, with the passage 60 and brake-cylinder passage 16.

In the practice of my invention I provide in the supplemental or quick-action piston 63 a discharge-passage 90, which extends through the piston and is prolonged by one or more lateral passages 91 to the periphery of the central sleeve of the piston, which fits around the stem 64 of the quick-action supply-valve 41, so that when the passage 90 is opened communication is established between the brake-cylinder passage 16 and the passage 61, leading to the chamber 24 of the main slide-valve 14. The passage 90 is controlled by a valve 92, which is formed or fixed on the end of the stem 64 of the supplemental or quick-action supply-valve, and is normally seated against the lower end of the passage 90 by the piston being brought by gravity against its face. It should be noted that the opening of the passage 90 to its extensions 91 by the raising of the piston 63 by air under pressure admitted to the passages 60 and 16 in making service-stops is immaterial, as the communicating supply-passage 61 is not at such periods in communication with the exhaust-passage 34.

In operation the release of the brakes is effected by an increase of pressure made by the engineer in the main air or brake pipe and the communicating passages 17 and 18 and main piston-chamber 11 in the usual manner, such increase of pressure moving the piston 12 and main slide-valve 14 to the position shown in the drawings, in which the brake-cylinder passage 16 and passage 61, leading into the piston-chamber 54, are in communication with the exhaust-passage 34, through the exhaust-recess 62 of the slide-valve 14. The air by which the application of the brakes has been effected is thereupon exhausted from the brake-cylinder through the passages 16 and 60, the exhaust-cavity 62 of the slide valve, and the exhaust-passage 34, as in Patent No. 376,837, and is also exhausted through the discharge-passage 90, (which has been brought into communication with the brake-cylinder passage 16, through its lateral extensions 91, by the elevation of the supplemental piston 63, effected by the escaping air,) and through the passage 61, the exhaust-cavity 62, and the exhaust-passage 34. The additional avenue of discharge for air from the brake-cylinder correspondingly facilitates the prompt release of the brakes, and, as will be obvious, is provided without variation from the essentials of the construction to which it is applied and by a simple and inexpensive modification of the same.

I claim as my invention and desire to secure by Letters Patent—

1. In a quick-acting triple-valve mechanism, the combination of a supplemental or quick-action piston provided with a discharge-passage, and a valve controlling said passage and fixed upon the stem of the quick-action supply-valve, which is actuated by the piston, substantially as set forth.

2. In a quick-acting triple-valve mechanism, the combination of a supplemental or quick-action piston having a central discharge-passage which is open to the supply-passage of the piston and one or more communicating lateral passages open to the brake-cylinder passage, and a valve controlling communication between the central and lateral passages of the piston and adapted to be seated by movement thereof toward the quick-action supply-valve which it actuates, substantially as set forth.

In testimony whereof I have hereunto set my hand.

FRANK MOORE.

Witnesses:
J. SNOWDEN BELL,
R. H. WHITTLESEY.